UNITED STATES PATENT OFFICE.

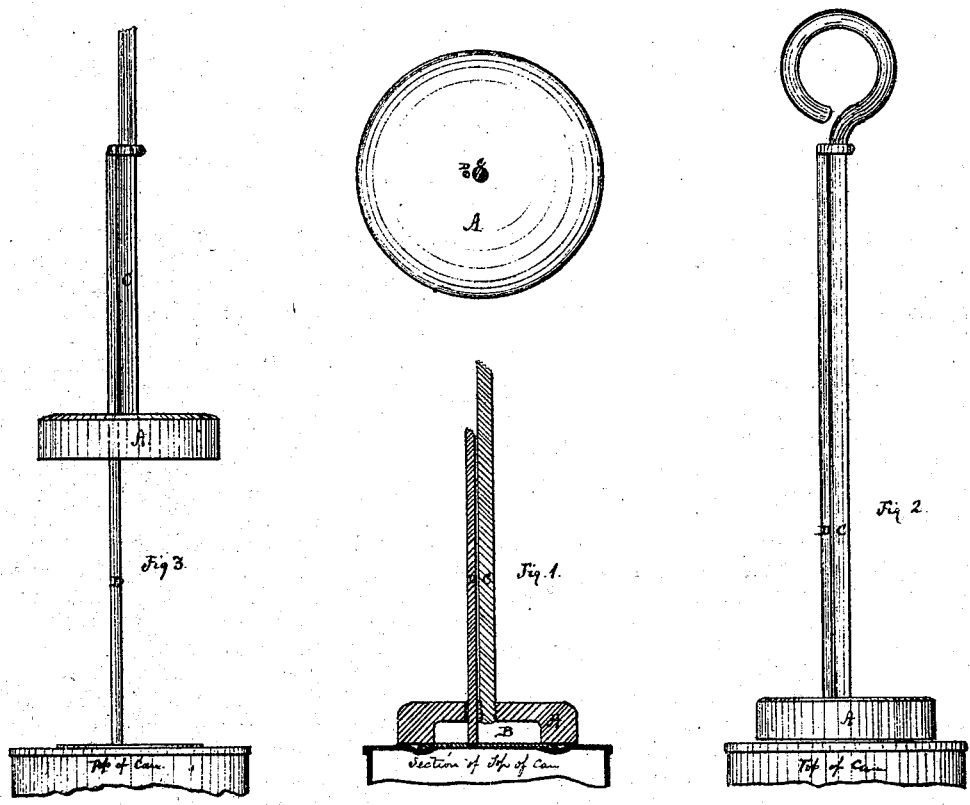

ABEL BARKER, OF WYOMING, PENNSYLVANIA.

IMPROVEMENT IN CAN-OPENERS.

Specification forming part of Letters Patent No. 103,125, dated May 17, 1870.

*To all whom it may concern:*

Be it known that I, ABEL BARKER, of Wyoming, county of Luzerne, and State of Pennsylvania, have invented a new and useful Machine for Opening and Closing or Sealing Fruit, Oyster, and all other Cans Hermetically Sealed; and I do hereby declare that the following is a full, clear, and exact description of the construction and operation of the same, reference being had to the annexed drawings, making a part of this specification, in which—

Figure 1 is a vertical section. Fig. 2 is a representation of the machine as applied to the can in opening; Fig. 3, as applied in closing or sealing, with the disk withdrawn and the sliding rod pressed upon the cover to hold it until the solder or sealing material hardens.

In constructing this machine I make the disk or casting A of sufficient thickness to retain the heat, and of suitable size to cover the lid of the can, with the recess B in the under side to give room for the convex lid of the can, and to confine the soldering process to the outer edge of the lid or cover.

To this disk I connect the handle C, of sufficient length to hold when heated

At the side of, and parallel with, the handle I connect the small rod or wire D, with a loop or ring connecting it with the handle at the top and the bottom, passing through the disk A, so as to allow it to slide up and down.

In opening or unsealing a can, the disk A is heated sufficiently to melt the solder, and placed over the cover till the solder is melted, when it is taken off, and the cover removed by any sharp pointed instrument. After the can is emptied, the cover may be replaced and slightly fastened on one side, till the can is wanted for cleaning and refilling, when it may be taken off and the can filled. The cover is then to be carefully laid in place on the can, and new solder or material placed around the lid, if necessary. The rod D is pushed down through the disk, and placed upon the center of the cover to hold it. The heated disk is then to be pushed down in contact with the solder or sealing material till it is melted, then turned back and forth till the solder is spread evenly around the lid. The disk is then to be withdrawn, with the rod D still pressed upon the lid, till the solder or sealing material sets or hardens, when the operation is completed.

What I claim, and desire to secure by Letters Patent, is—

The disk A, with the recess B in the under side, as set forth, in combination with the movable rod or wire D, to hold the lid while resealing or closing.

ABEL BARKER.

Witnesses:
BENJN. H. THROOP,
EDWARD J. DIMMICK.